United States Patent
Yasuda et al.

(10) Patent No.: US 7,354,061 B2
(45) Date of Patent: Apr. 8, 2008

(54) AIRBAG APPARATUS FOR VEHICLE

(75) Inventors: Mitsuo Yasuda, Nanto (JP); Ryoichi Katagishi, Nanto (JP); Yusuke Ishikuro, Nanto (JP)

(73) Assignee: SANKO GOSEI Kabushiki Kaisha, Nanto-shi (JP)

(*) Notice: Subject to any disclaimer, the term of this patent is extended or adjusted under 35 U.S.C. 154(b) by 149 days.

(21) Appl. No.: 11/442,023

(22) Filed: May 25, 2006

(65) Prior Publication Data

US 2006/0267313 A1 Nov. 30, 2006

(30) Foreign Application Priority Data

May 31, 2005 (JP) ............... 2005-160250

(51) Int. Cl.
*B60R 21/20* (2006.01)
(52) U.S. Cl. .................... 280/728.3; 280/732
(58) Field of Classification Search ........... 280/732, 280/728.3, 728.2
See application file for complete search history.

(56) References Cited

U.S. PATENT DOCUMENTS

| | | | | |
|---|---|---|---|---|
| 5,772,240 | A | * 6/1998 | Vavalidis | ............... 280/728.3 |
| 6,692,017 | B2 | 2/2004 | Taoka et al. | |
| 6,726,239 | B1 | 4/2004 | Teranishi et al. | |
| 6,761,375 | B2 | 7/2004 | Kurachi et al. | |
| 7,007,970 | B2 | 3/2006 | Yasuda et al. | |
| 7,165,782 | B2 | * 1/2007 | Yasuda et al. | ............ 280/728.3 |
| 7,275,759 | B2 | * 10/2007 | Sawada | ............... 280/728.3 |
| 2003/0184063 | A1 | * 10/2003 | Yasuda et al. | ............... 280/732 |
| 2005/0140121 | A1 | * 6/2005 | Hayashi et al. | ........... 280/728.3 |
| 2005/0184488 | A1 | * 8/2005 | Yasuda et al. | ........... 280/728.3 |
| 2006/0202447 | A1 | * 9/2006 | Sawada | ............... 280/728.3 |

FOREIGN PATENT DOCUMENTS

JP 2004-1677 8/2004

OTHER PUBLICATIONS

PCT International Publication No. WO 99/01317, published Jan. 14, 1999.

\* cited by examiner

*Primary Examiner*—Paul N. Dickson
*Assistant Examiner*—Joseph Rocca
(74) *Attorney, Agent, or Firm*—W. Norman Roth

(57) ABSTRACT

An airbag apparatus for a vehicle includes an interior panel, an airbag; an inflater, a frame, and a pair of reinforcement members. When the airbag inflates, a fracture-opening section of the interior panel is ruptured and divided into two fracture-opening subsections, which are turned outward about hinge portions of the reinforcement members in a manner of a casement. Hinge motion restricting members are provided on the frame. When the fracture-opening subsections are turned, the hinge motion restricting members come into engagement with the hinge portions. This configuration eliminates interference between the fracture-opening subsections and the interior panel, which interference would otherwise occur when the fracture-opening subsections are opened in the manner of a casement.

7 Claims, 8 Drawing Sheets

F I G. 5
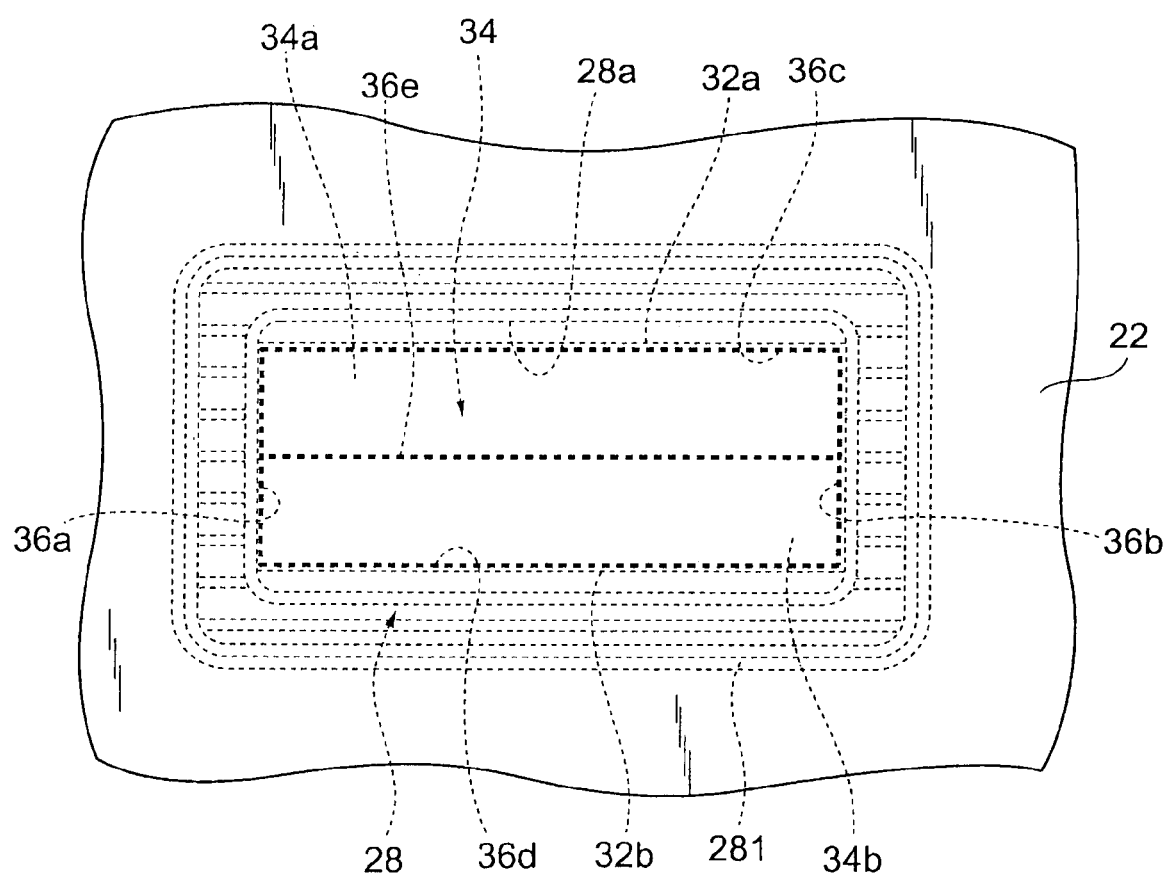

F I G. 6
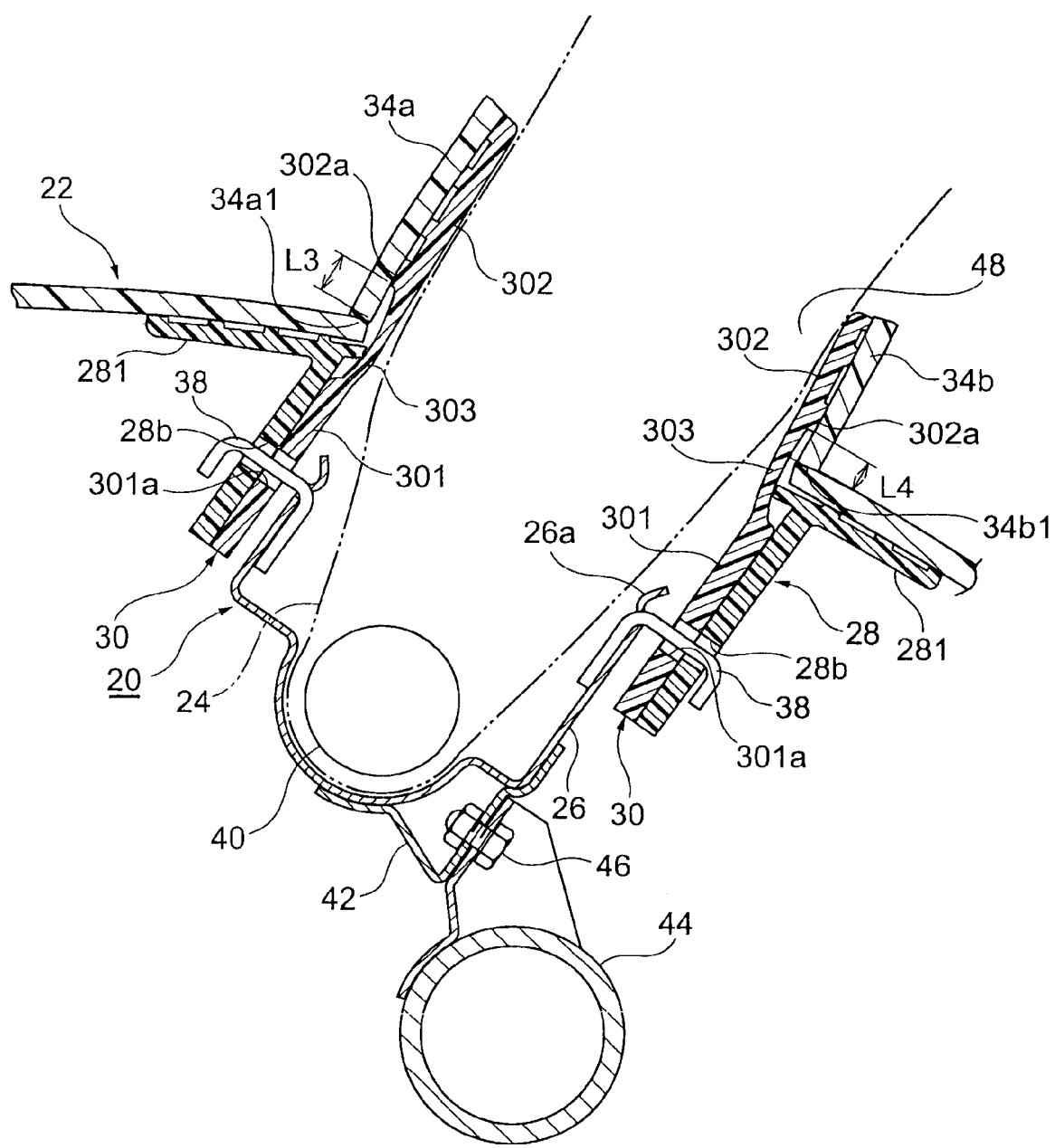

F I G. 7
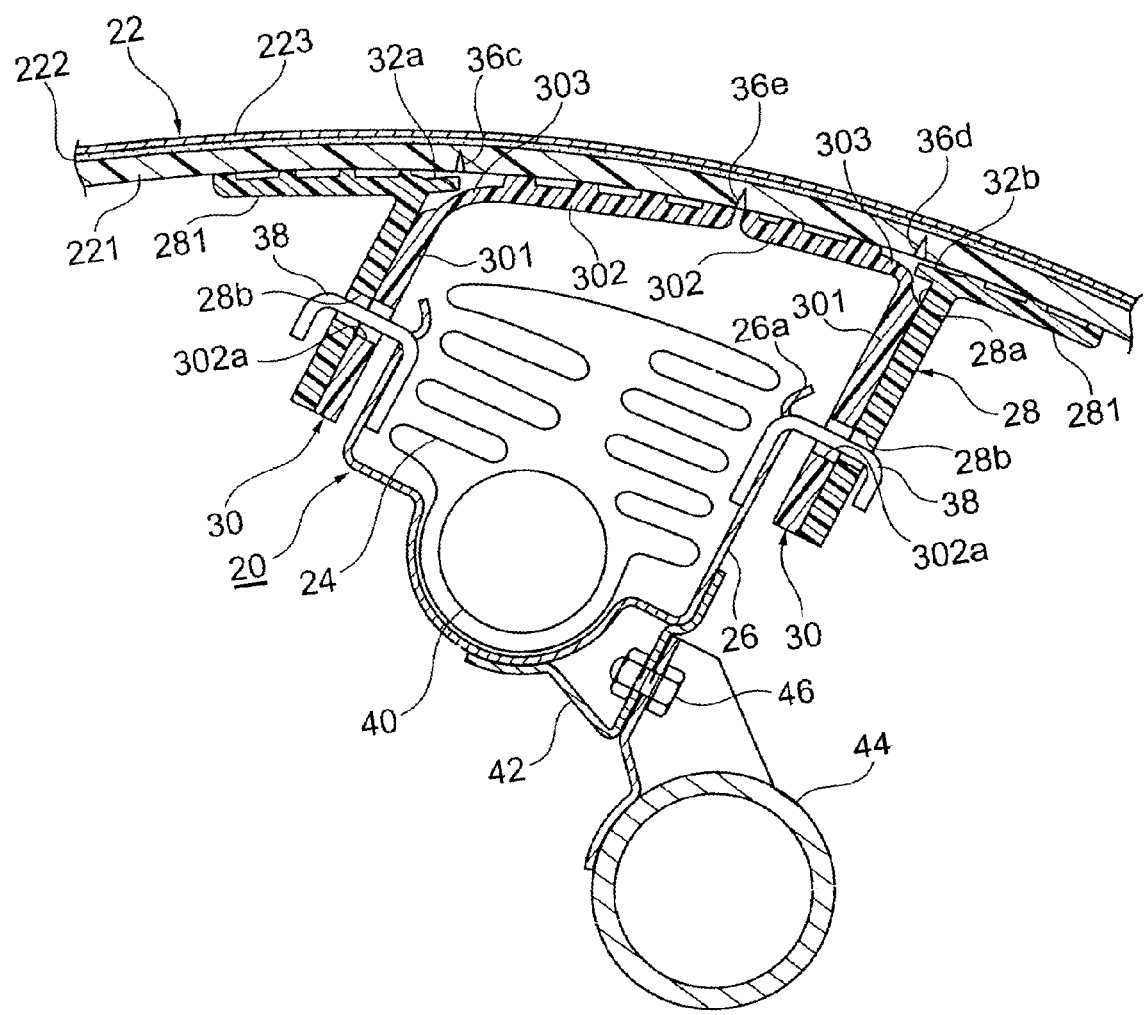

F I G. 8
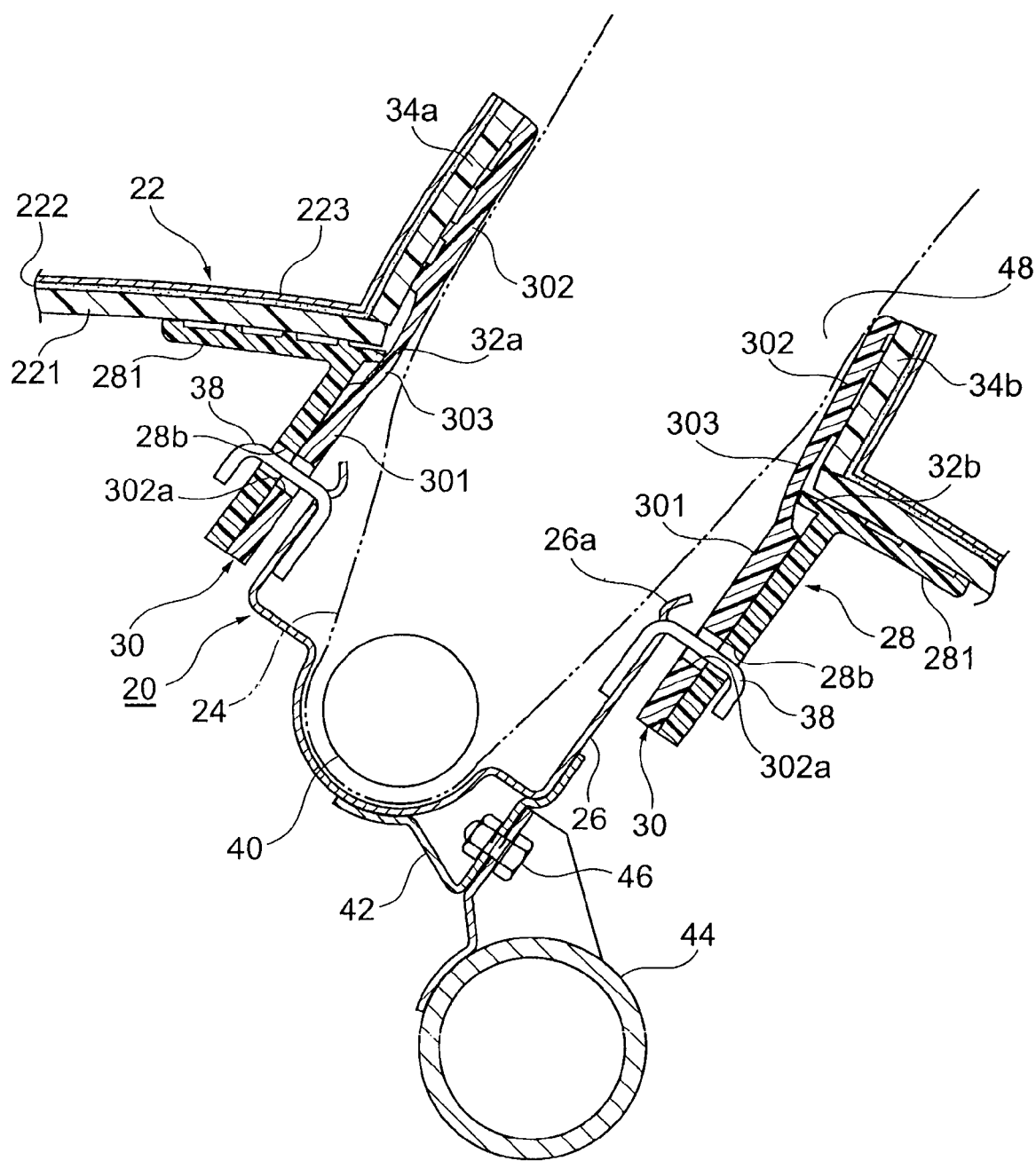

AIRBAG APPARATUS FOR VEHICLE

BACKGROUND OF THE INVENTION

1. Field of the Invention

The present invention relates to an airbag apparatus for a vehicle for protecting a person in a vehicle such as an automobile; for example, a driver or a passenger sitting in the front passenger seat, from impact upon head-on or side collision of the vehicle, to thereby ensure safety of the person. More particularly, the invention relates to an airbag apparatus for a vehicle configured such that upon inflation and deployment of an airbag, a portion of an interior panel surrounded by a fracture groove for fracture opening is ruptured along the fracture groove to thereby enable the airbag to inflate and deploy to the outside (front side) of the interior panel.

The term "fracture groove" used in relation to the present invention refers to a weakened portion or a fracture portion for fracture opening which is composed of successive holes formed on the reverse or inside surface of an interior panel of a vehicle through irradiation with a laser beam generated from laser generation means in the form of laser pulses, or a groove continuously or intermittently formed on the reverse or inside surface of the interior panel by use of a cutting tool or the like.

2. Description of the Related Art

There has been known an airbag apparatus for a vehicle for protecting a person in a vehicle such as an automobile; for example, a driver or a passenger sitting in the front passenger seat, from impact upon head-on or side collision of the vehicle.

Such an airbag apparatus includes an airbag, an airbag case for accommodating the airbag folded such that the airbag can easily inflate and deploy, and an inflater for inflating the folded airbag within a short period of time. In particular, an airbag apparatus which is used for the front passenger seat of an automobile is disposed behind an interior panel of the automobile. When the automobile decelerates suddenly because of, for example, a collision, the inflater is operated so as to rapidly inflate the airbag, to thereby rupture and open the interior panel along the fracture groove and cause the airbag to inflate and deploy toward the outside of the interior panel through the opening. Thus, the airbag apparatus protects the passenger from impact of the collision.

The fracture groove for causing the airbag of the airbag apparatus to inflate and deploy toward the outside of the interior panel are formed by forming successive small holes on the reverse surface of the interior panel through irradiation with a laser beam (see, for example, Japanese Patent Application Laid-Open (kokai) No. 2004-1677).

A conventional airbag apparatus for a vehicle will be described with reference to FIGS. 1 to 3.

FIG. 1 is a vertical cross sectional view of a main portion of a conventional airbag apparatus for a vehicle; FIG. 2 is a plan view of the main portion; and FIG. 3 is a vertical cross sectional view showing operation of the airbag apparatus when the airbag is inflated.

As shown in FIG. 1, an airbag apparatus 1 for a vehicle includes an interior panel 2, an airbag 3, an airbag case 4, a frame 5, a pair of reinforcement members 6, an unillustrated inflater, etc.

The interior panel 2 is attached in front of the front passenger seat of a vehicle; e.g., an automobile, and is formed of a synthetic resin material, such as polypropylene. Further, when necessary, the outer surface of the interior panel 2 is covered with a surface layer.

As shown in FIGS. 1 and 2, a fracture groove 7 is formed on the reverse surface of the interior panel 2 so as to form an opening 8 (see FIG. 3) when the. airbag apparatus is operated, to thereby enable the airbag 3 to inflate and deploy to the outside of the interior panel 1 through the opening 8.

As shown in FIGS. 1 and 2, the fracture groove 7, which forms a laterally elongated rectangle of a size corresponding composed of hinge-side fracture groove sections 7a and 7b corresponding to the two longer sides of the rectangle, side fracture groove sections 7c and 7d corresponding to the two shorter sides of the rectangle, and a center fracture groove section 7e extending between the side fracture groove sections 7c and 7d in parallel with the hinge-side fracture groove sections 7a and 7b. The fracture groove sections 7a to 7e enable the rectangular region surrounded by the fracture groove sections 7a to 7e to be ruptured and opened in the manner of a casement (i.e., French window).

The fracture groove sections 7a to 7e are formed by forming successive small holes (blind holes) on the reverse surface of the interior panel 2 through irradiation with an infrared laser beam having a beam diameter of 0.2 to 0.5 mm and a wavelength of 10.6 µm, in such a manner that the small holes do not pass completely through the interior panel 2.

The frame 5, which assumes a rectangular tubular shape, is bonded, by means of vibration welding or any other suitable process, to the reverse surface of the interior panel 2 via a flange portion 5A of the frame 5. The frame 5 is formed of a synthetic resin material, and extends along the rectangular fracture groove 7 so as to surround the groove.

The pair of reinforcement members 6, formed of a synthetic resin material, are attached to the inner wall surface of the frame 5, and are bonded to the reverse surface of the interior panel 2 so as to reinforce a portion of the interior panel 2 surrounded by the fracture groove 7.

Each of the reinforcement members 6 includes a support portion 6a coupled with the inner wall surface of the frame 5 via a dovetail, and a reinforcement portion 6c bendably connected via a hinge portion 6b to the upper end of the support portion 6a and bonded, by means of vibration welding or any other suitable process, to the reverse surface of the portion of the interior panel 2 surrounded by the fracture groove 7.

The airbag 3 is accommodated within the airbag case 4 formed from a metal plate in a folded condition as shown in FIG. 1.

A plurality of hooks 9 are provided on the side wall portions of the airbag case 4 in the vicinity of an upper end opening 4a thereof such that they project outward. The hooks 9 are engaged with holes 6d in the support portions 6a of the reinforcement members 6 and holes 5b formed in the frame 5 to correspond to the holes 6d, whereby the airbag case 4 is secured to the frame 5.

An inflator accommodation portion 10 is provided at the lower end of the airbag case 4 so as to accommodate an inflater (not shown) for supplying an inflation gas to the airbag 3. The airbag case 4 is fixed to a stationary member, such as a cross member 12, via a support member 11 and by means of a bolt and nut 13.

The thus-configured conventional airbag apparatus vehicle, an impact force caused by the collision is detected by an unillustrated sensor. A control unit including a CPU judges whether or not the detected impact force is equal to or greater than a predetermined value. When the control unit judges that the impact force is equal to or greater than the predetermined value, the control unit issues a signal for causing the inflater to generate a high-pressure gas. The gas is fed to the airbag 3 so as to promptly inflate the airbag 3. The inflating airbag 3 presses, from inside, the portion of the interior panel 2 surrounded by the fracture groove 7. As a result, the center fracture groove section 7e, the side fracture groove sections 7c and 7d, and the hinge-side fracture groove sections 7a and 7b are fractured, whereby the portion surrounded by the fracture groove 7 is divided into two fracture-opening subsections 2A and 2B. The fracture-opening subsections 2A and 2B are separated from the interior panel 2, and are opened in the manner of a casement as shown in FIG. 3, while being turned about the hinge portions 6b of the reinforcement members 6. As a result, the airbag 3 inflates and deploys to the outside of the interior panel 2 via the opening 8, which is formed through opening of the fracture-opening subsections 2A and 2B. Serving as a cushion, the inflated airbag 3 supports the passenger at his/her chest or head, thereby protecting the passenger from the impact force of collision.

However, the above-described conventional airbag apparatus for a vehicle has the following drawback. In a state where the fracture-opening subsections 2A and 2B are opened in the manner of a casement as shown in FIG. 3, a rupture edge 2A1 of the fracture-opening subsection 2A along the hinge-side fracture groove section 7a and the distance L1 between the rupture edge 2A1 and a welding rib 6c1 of the reinforcement portion 6c of the corresponding reinforcement member 6 are relatively long. Similarly, a rupture edge 2B1 of the fracture-opening subsection 2B along the hinge-side fracture groove section 7b and the distance L2 between the rupture edge 2B1 and a welding rib 6c1 of the reinforcement portion 6c of the corresponding reinforcement member 6 are relatively long. Therefore, when the fracture-opening subsections 2A and 2B are opened in the manner of a casement as shown in FIG. 3, the rupture edges 2A1 and 2B1 of the fracture-opening subsections 2A and 2B abut against the surface of the interior panel 2 to thereby limit the open angles of the fracture-opening subsections 2A and 2B. That is, as shown in FIG. 3, the open angles of the fracture-opening subsections 2A and 2B are limited such that the fracture-opening subsections 2A and 2B incline toward each other. Therefore, when the inflation pressure of the airbag 3 acts on the inclined fracture-opening subsections 2A and 2B when the airbag 3 inflates toward the outside of the interior panel 2 via the opening 8, the welding ribs 6c1 of the reinforcement portions 6c may separate from the fracture-opening subsections 2A and 2B, or cracks may be generated in corresponding to the welding ribs 6c1, so that portions of the fracture-opening subsections 2A and 2B extending from the cracks over the distance L1 and L2, respectively, may break and scatter as indicated by imaginary lines in FIG. 3.

Moreover, since the open angles of the fracture-opening subsections 2A and 2B are limited such that the fracture-opening subsections 2A and 2B incline toward each other, the inflation of the airbag 3 toward the outside of the interior panel 2 is restricted.

SUMMARY OF THE INVENTION

In view of the foregoing, an object of the present invention is to provide an airbag apparatus for a vehicle which is configured such that upon inflation of an airbag, a portion of an interior panel of the vehicle surrounded by a fracture groove is divided into two fracture-opening subsections to be opened in the manner of a casement and which eliminates interference between the fracture-opening subsections and the interior panel, which interference would otherwise occur when the fracture-opening subsections are opened in the manner of a casement.

Another object of the present invention is to provide an airbag apparatus for a vehicle which facilitates deployment of the airbag toward the outside of the interior panel of the vehicle.

To achieve the above object, the present invention provides an airbag apparatus for a vehicle comprising an interior panel provided inside a passenger compartment of the vehicle; an airbag; an airbag case for accommodating the airbag in a folded condition; an inflater for supplying a gas to the airbag so as to inflate and deploy the airbag; a frame formed of a resin and supporting the airbag case behind the interior panel, the frame having a rectangular opening of an area required for inflation and deployment of the airbag, and an opening-side end portion of the frame being bonded to a reverse surface of the interior panel; and a pair of reinforcement members formed of a resin and reinforcing a fracture-opening section of the interior panel, the fracture-opening section facing the rectangular opening of the frame. Hinge motion restricting members are provided along a first pair of opposite sides of the rectangular opening of the frame in such a manner that the hinge motion restricting members project inward over a predetermined distance. A fracture groove is formed on the reverse surface of the fracture-opening section of the interior panel so as to enable the airbag to inflate and deploy toward the front side of the interior panel while rupturing the fracture-opening section. The fracture grove is composed of side fracture groove sections corresponding to a second pair of opposite sides of the rectangular opening, hinge-side fracture groove sections corresponding to ends of the hinge motion restricting members or locations offset from the ends of the hinge motion restricting members toward a central area of the opening, and a center fracture groove section connecting the side fracture groove sections. Each reinforcement member includes a support portion for coupling the reinforcement member with the frame, a reinforcement portion bonded to the reverse surface of the fracture-opening section surrounded by the hinge-side fracture groove sections, the side fracture groove sections, and the center fracture groove section, and a hinge portion facing the corresponding hinge motion restricting member and connecting the support portion and the reinforcement portion in a bendable manner.

By virtue of this configuration, when the airbag is inflated and deployed, the fracture-opening section is divided into the two fracture-opening subsections surrounded by the hinge-side fracture groove section sections, the side fracture groove section sections, and the center fracture groove section section; and the fracture-opening subsections are separated from the interior panel, and are opened in the manner of a casement, while being turned about hinge portions of the reinforcement members, whereby the hinge portions come into engagement with the hinge motion restricting members. Therefore, it becomes possible to prevent the hinge-side rupture edges of the fracture-opening subsections from interfering with the interior panel, which interference would otherwise occur when the fracture-opening subsections are opened in the manner of a casement. In addition, the above-described configuration facilitates deployment of the airbag toward the outside of the interior panel of the vehicle.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 5 is a plan view of a fracture-opening section of the interior panel;

FIG. 6 is a vertical cross sectional view showing operation of the airbag apparatus of FIG. 4 when the airbag is inflated;

FIG. 7 is a vertical sectional view of a main portion of an airbag apparatus for a vehicle according to a second embodiment of the present invention; and FIG. 8 is a vertical cross sectional view showing operation of the airbag apparatus of FIG. 7 when the airbag is inflated.

DESCRIPTION OF THE PREFERRED EMBODIMENTS

First Embodiment

A first embodiment in which an airbag apparatus for a vehicle according to the present invention is attached to an interior panel provided in front of a front passenger seat of an automobile will next be described in detail with reference to FIGS. 4 to 6.

Figure 1:
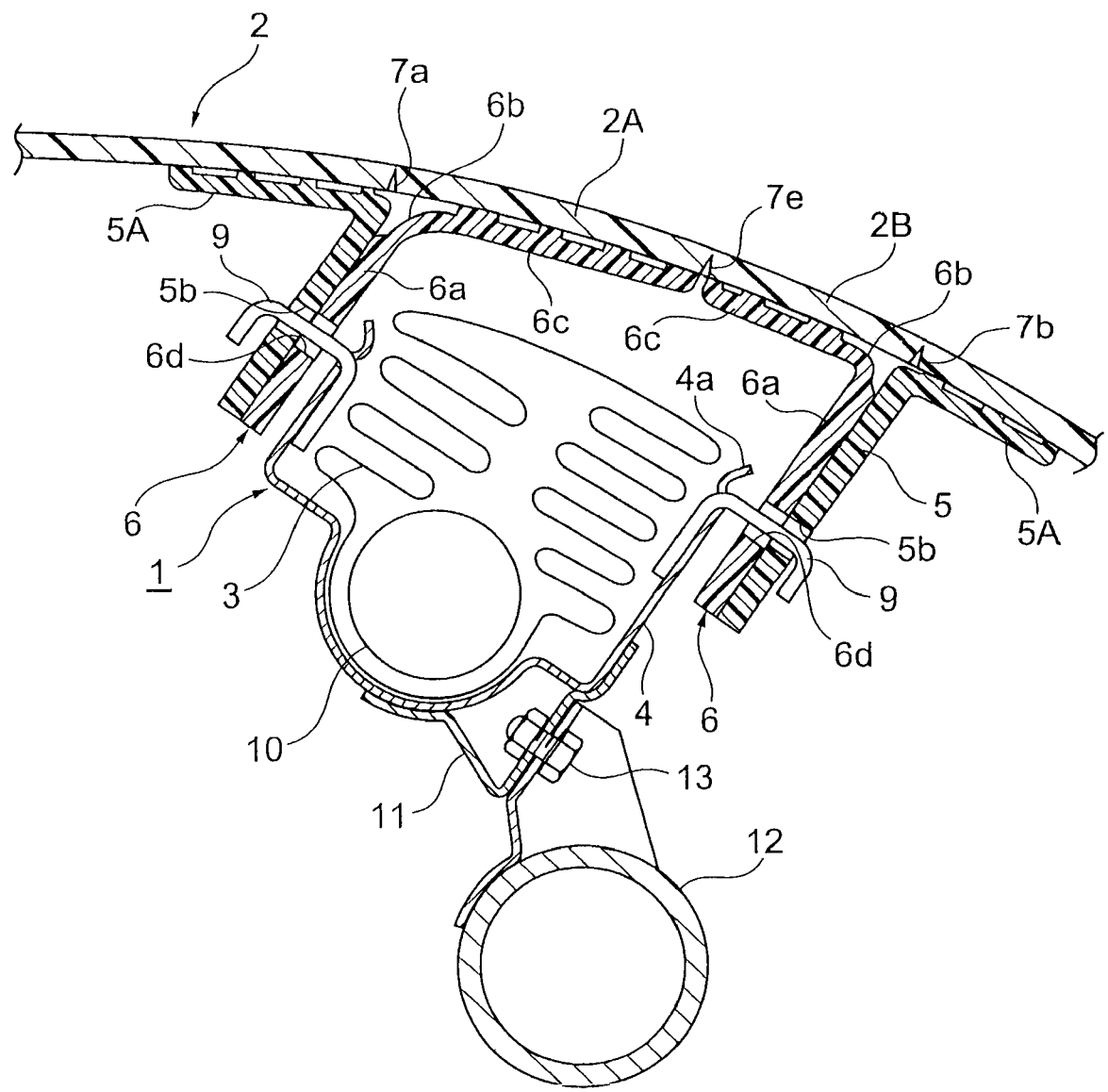
FIG. 1 is a vertical cross sectional view of a main portion of a conventional airbag apparatus for a vehicle.
Figure 2:
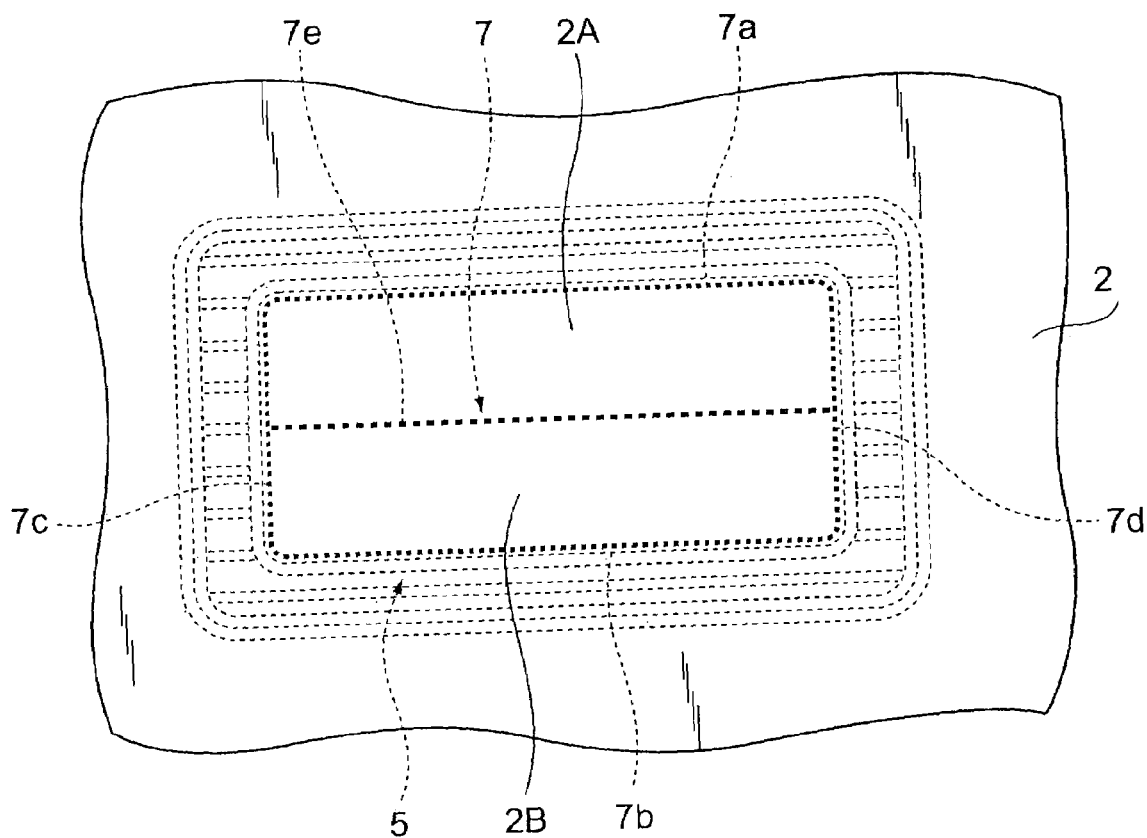
FIG. 2 is a plan view of the main portion.
Figure 3:
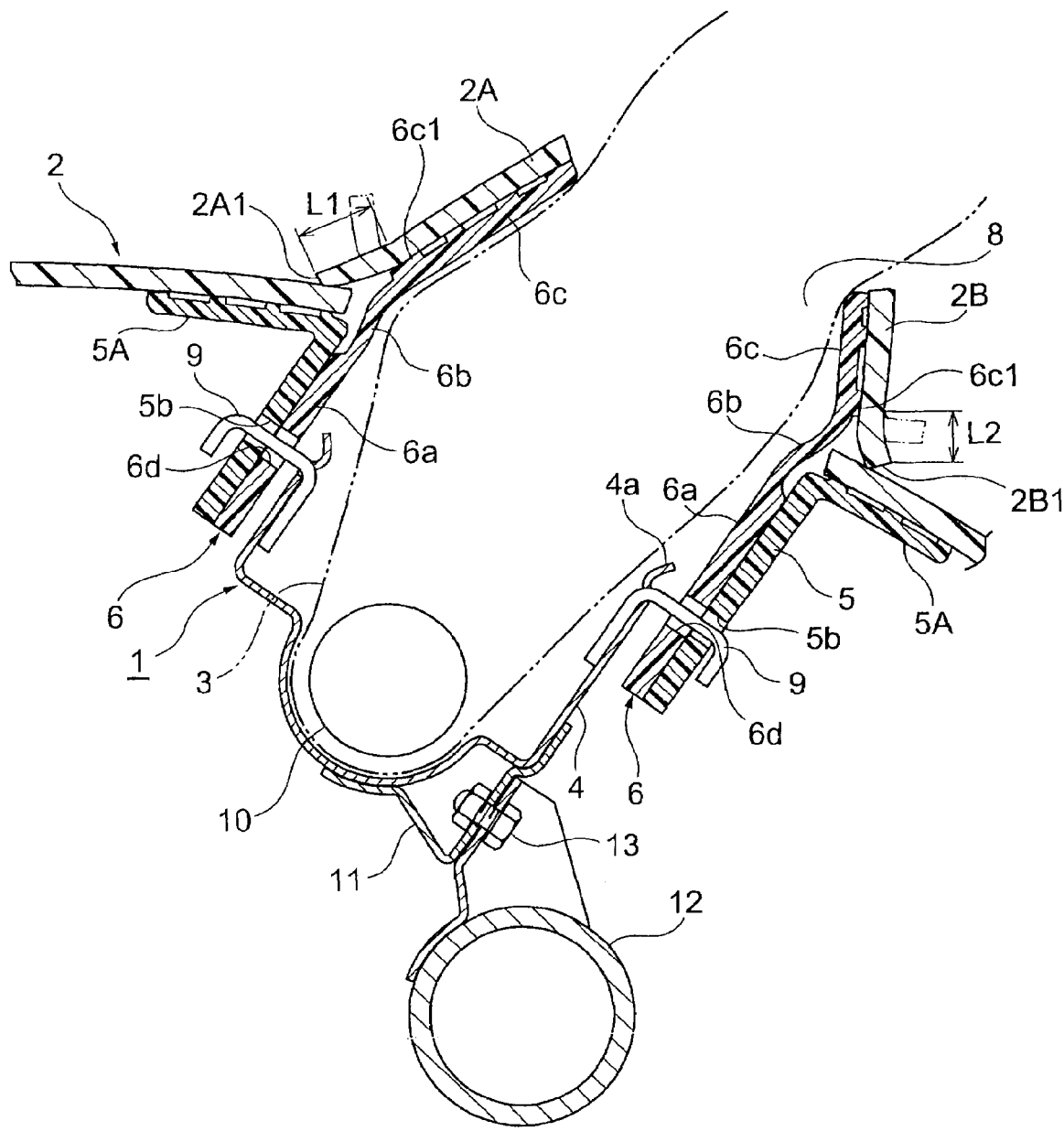
FIG. 3 is a vertical cross sectional view showing operation of the airbag apparatus when the airbag is inflated.
Figure 4:
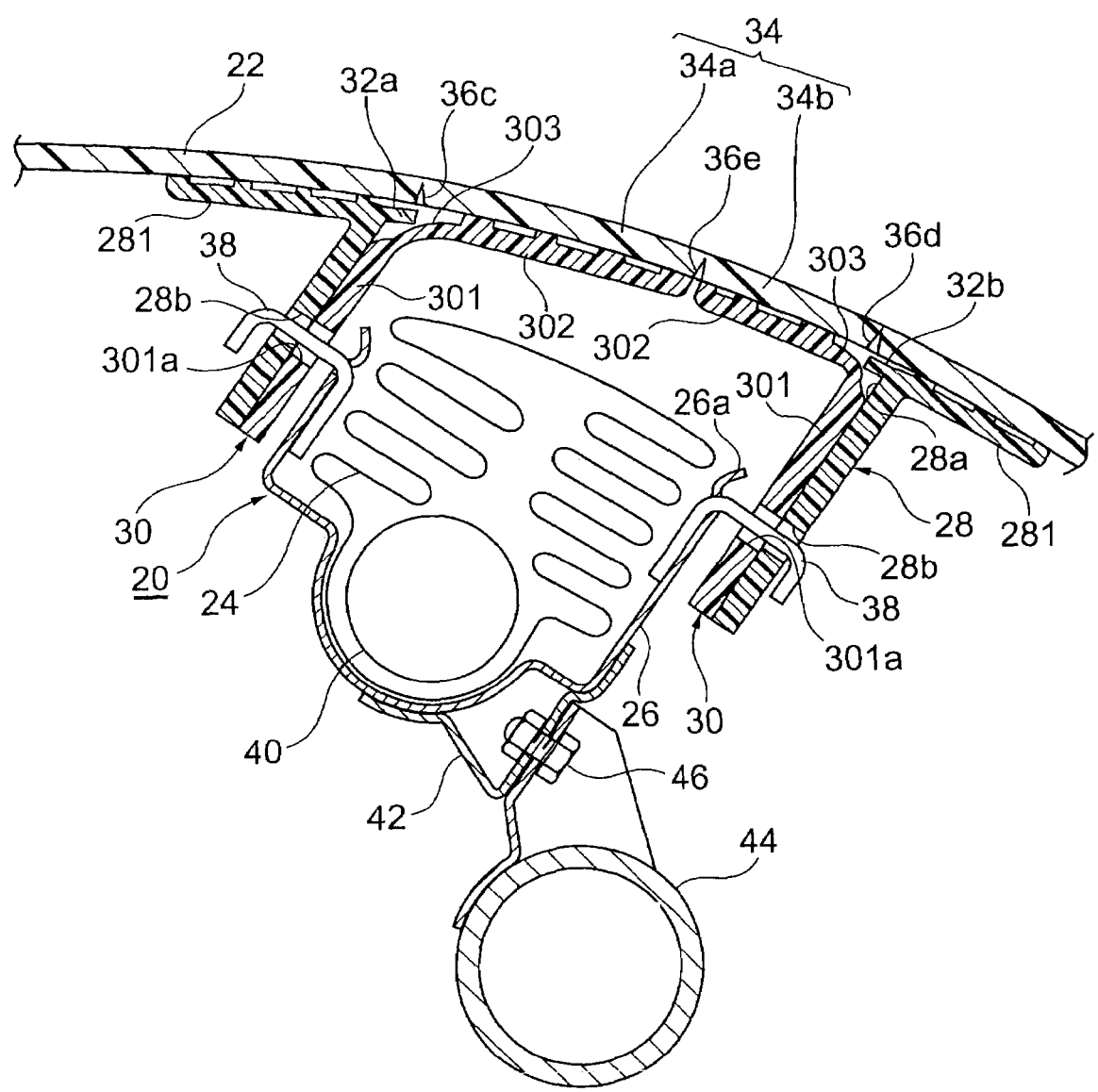
FIG. 4 is a vertical sectional view of a main portion of an airbag apparatus for a vehicle according to a first embodiment of the present invention, showing an example case where the airbag apparatus is attached to an interior panel for a front passenger seat.

As shown in FIG. 4, an airbag apparatus 20 for a vehicle includes an interior panel 22, an airbag 24, an airbag case 26, a frame 28, a pair of reinforcement members 30, an unillustrated inflater, etc.

The interior panel 22 is attached in front of the front passenger seat of the automobile, and is formed of a synthetic resin material, such as polypropylene, such that the interior panel 22 has a three-dimensional curved surface.

As shown in FIGS. 4 and 5, the frame 28 holds the airbag case 26 and the reinforcement members 30 on the reverse surface side of the interior panel 22. The frame 28 is formed of a highly elastic, polypropylene-based resin material containing a reinforcing material such as talc and glass fiber in an amount of 10 to 30% by weight, and assumes the form of a rectangular tubule having a transverse cross sectional area required to inflate and deploy the airbag 24. The frame 28 has a rectangular opening 28a having the same transverse cross sectional area. A joint flange 281 is integrally formed at the upper end of the frame 28 where the opening 28a is provided, and extends outward perpendicular to the frame 28. The flange 281 is bonded, by means of vibration welding or any other suitable process, to the reverse surface of the interior panel 22, whereby the frame 28 is fixed to the interior panel 22.

Moreover, as shown in FIGS. 4 and 5, hinge motion restricting portions (hinge motion restricting members) 32a and 32b are formed along the entirety of the opposite longer sides of the rectangular opening 28a of the frame 28 in such a manner that the hinge motion restricting portions 32a and 32b project toward the longitudinal centerline (or a central area) of the opening 28a over a predetermined distance.

As shown in FIGS. 4 and 5, a rectangular portion of the interior panel 22 facing the rectangular opening 28a of the frame 28 serves as a fracture-opening section 34 for allowing the airbag 24 to inflate and deploy through the interior panel 22. A fracture groove 36 is formed on the reverse surface of the interior panel 22 to be located within the fracture-opening section 34 so as to form an opening 48 (see FIG. 6) when the airbag apparatus is operated, to thereby enable the airbag 24 to inflate and deploy to the outside of the interior panel 22 through the opening 48.

As shown in FIGS. 4 and 5, the fracture groove 36 is composed of side fracture groove sections 36a and 36b which are formed on the reverse surface of the fracture-opening section 34 to face the shorter sides of the rectangular opening 28a; hinge-side fracture groove sections 36c and 36d which are formed on the reverse surface of the fracture-opening section 34 at locations corresponding to the ends of the hinge motion restricting portions 32a and 32b or locations offset from the ends of the hinge motion restricting portions 32a and 32b toward the longitudinal centerline of the opening 28a; and a center fracture groove section 36e which is formed on the reverse surface of the fracture-opening section 34 to connect the side fracture groove sections 36a and 36b.

When the airbag 24 inflates and deploys, the fracture-opening section 34 is divided into two fracture-opening subsections 34a and 34b, surrounded by the side fracture groove sections 36a and 36b, the hinge-side fracture groove sections 36c and 36d, and the center fracture groove section 36e. As shown in FIG. 6, the fracture-opening subsections 34a and 34b are separated from the interior panel 22, and are opened in the manner of a casement, while being turned about hinge portions 303 of the reinforcement members 30, whereby the hinge portions 303 come into engagement with the hinge motion restricting portions 32a and 32b.

As shown in FIGS. 4 and 5, the paired reinforcement members 30, which reinforce the fracture-opening section 34 from the reverse side thereof, are formed of a synthetic resin such as polypropylene (PP) or thermoplastic polyolefin (TPO).

Each of the reinforcement members 30 includes a support portion 301 coupled with the inner wall surface of the frame 28 via a dovetail; a reinforcement portion 302 bonded, by means of vibration welding or any other suitable process, to the reverse surfaces of the fracture-opening subsections 34a and 34b, which are ruptured along the side fracture groove sections 36a and 36b, the hinge-side fracture groove sections 36c and 36d, and the center fracture groove section 36e; and the hinge portion 303 which faces the hinge motion restricting portion 32a or 32b and which connects the support portion 301 and the reinforcement portion 302 in a bendable manner.

The center fracture groove section 36e is offset from the boundary between the two fracture-opening subsections 34a and 34b toward the fracture-opening subsection 34b, so that the area of the fracture-opening subsection 34a becomes greater than that of the fracture-opening subsection 34b.

Before attachment of the frame 28 and the reinforcement members 30 to the interior panel 22, the fracture groove sections 36a to 36e are formed by forming successive small holes (blind holes) on the reverse surface of the interior panel 22 through irradiation with an infrared laser beam having a beam diameter of 0.2 to 0.5 mm and a wavelength of 10.6 μm, in such a manner that the small holes do not pass completely through the interior panel 22.

The airbag 24 is accommodated within the airbag case 26 formed from a metal plate in a folded condition as shown in FIG. 4.

A plurality of hooks 38 are provided on the side wall portions of the airbag case 26 in the vicinity of an upper end opening 26a thereof such that they project outward. The hooks 38 are engaged with holes 301a formed in the support portions 301 of the reinforcement members 30 and holes 28b formed in the frame 28 to correspond to the holes 301a, whereby the airbag case 26 is secured to the frame 28.

An inflator accommodation portion 40 is provided at the lower end of the airbag case 26 so as to accommodate an inflater (not shown) for supplying an inflation gas to the airbag 24. The airbag case 26 is fixed to a stationary member, such as a cross member 44, via a support member 42 and by means of a bolt and nut 46.

The thus-configured airbag apparatus 20 of the first embodiment functions in the following manner.

Upon collision of the vehicle, an impact force caused by the collision is detected by an unillustrated sensor. A control unit including a CPU judges whether or not the detected impact force is equal to or greater than a predetermined value. When the control unit judges that the impact force is equal to or greater than the predetermined value, the control unit issues a signal for causing the inflater to generate a high-pressure gas. The gas is fed to the airbag 24 so as to promptly inflate the airbag 24. The inflating airbag 24 presses, from inside, the fracture-opening section 34 surrounded by the fracture groove sections 36a to 36d. As a result, the center fracture groove section 36e, the side fracture groove sections 36a and 36b, and the hinge-side fracture groove sections 36c and 36d of the fracture-opening section 34 are fractured, whereby the fracture-opening section 34 surrounded by the fracture groove sections 36a to 36d is divided into the two fracture-opening subsections 34a and 34b. The fracture-opening subsections 34a and 34b are separated from the interior panel 22, and are opened in the manner of a casement as shown in FIG. 6, while being turned about hinge portions 303 of the reinforcement members 30, whereby the hinge portions 303 come into engagement with the hinge motion restricting portions 32a and 32b. As a result, the airbag 24 inflates and deploys to the outside of the interior panel 22 via the opening 48, which is formed through opening of the fracture-opening subsections 34a and 34b in the manner of a casement. Serving as a cushion, the inflated airbag 24 supports the passenger at his/her chest or head, thereby protecting the passenger from the impact force of collision.

In the airbag apparatus 20 according to the first embodiment, the hinge motion restricting portions 32a and 32b are formed along the entirety of the opposite longer sides of the rectangular opening 28a of the frame 28 in such a manner that the hinge motion restricting portions 32a and 32b project toward the longitudinal centerline of the opening 28a; the fracture groove 36, which enables the airbag 24 to inflate and deploy toward the outside the interior panel 22 via the fracture-opening section 34 of the interior panel 22, include the side fracture groove sections 36a and 36b, the hinge-side fracture groove sections 36c and 36d, and the center fracture groove section 36e; when the airbag 24 inflates and deploys, the fracture-opening section 34 is divided into the two fracture-opening subsections 34a and 34b, surrounded by the side fracture groove sections 36a and 36b, the hinge-side fracture groove sections 36c and 36d, and the center fracture groove section 36e, whereby the fracture-opening subsections 34a and 34b are separated from the interior panel 22, are opened in the manner of a casement, while being turned about hinge portions 303 of the reinforcement members 30, and the hinge portions 303 are brought into engagement with the hinge motion restricting portions 32a and 32b. Therefore, even when the fracture-opening subsections 34a and 34b, which have been separated as a result of rupture of the side fracture groove sections 36a and 36b, the hinge-side fracture groove sections 36c and 36d, and the center fracture groove section 36e, are opened in the manner of a casement as shown in FIG. 6, hinge-side rupture edges 34a1 and 34b1 of the fracture-opening subsections 34a and 34b come into engagement with the outer surface of the interior panel 22. Thus, it becomes possible to prevent the fracture-opening subsections 34a and 34b from separating from the reinforcement portions 302 of the reinforcement members 30 and to prevent the fracture-opening subsections 34a and 34b from breaking and scattering In addition, since, as shown in FIG. 6, the fracture-opening subsections 34a and 34b are opened in the manner of a casement so as to extend generally perpendicular to the interior panel 22, inflation of the airbag toward the outside of the interior panel 22 is facilitated.

In the first embodiment, the hinge-side fracture groove sections 36c and 36d of the fracture-opening section 34 are formed at locations corresponding to the ends of the hinge motion restricting portions 32a and 32b or locations offset from the ends of the hinge motion restricting portions 32a and 32b toward the longitudinal centerline of the opening 28a. Therefore, as shown in FIG. 6, a distance L3 between the hinge-side rupture edge 34a1 of the fracture-opening subsection 34a and a welding rib 302a of the corresponding reinforcement portion 302 and a distance L4 between the hinge-side rupture edge 34b1 of the fracture-opening subsection 34b and a welding rib 302a of the corresponding reinforcement portion 302 can be shortened as compared with those in conventional airbag apparatuses. Therefore, the fracture-opening subsections 34a and 34b, which have been separated as a result of rupture of the fracture groove 36, can be smoothly opened in opposite directions without causing interference with the interior panel 22, and deployment of the airbag can be facilitated.

In the first embodiment, the center fracture groove section 36e is offset from the boundary between the two fracture-opening subsections 34a and 34b toward the fracture-opening subsection 34b, so that the area of the fracture-opening subsection 34a becomes greater than that of the fracture-opening subsection 34b. This configuration enables the airbag 24 to reliably inflate and deploy toward a passenger in the front-passenger seat of the automobile, to thereby secure safety of the passenger.

Second Embodiment

A second embodiment of the present invention will next be described with reference to FIGS. 7 and 8.

In FIG. 7, components identical with those of the first embodiment shown in FIG. 4 are denoted by the same reference numerals, and their repeated descriptions are omitted. A portion different from the embodiment shown in FIG. 4 will mainly be described.

As is apparent from FIG. 7, the second embodiment differs from the first embodiment in that the interior panel 22 has a three-layer structure; i.e., includes a substrate 221 formed of hard polypropylene (PP) and having a thickness of 3 mm to 4 mm; a foam layer 222 layered over and bonded to the surface of the substrate 221, formed of foamed polypropylene, and having a thickness of 1.5 mm to 2 mm; and a surface layer 223 layered over and bonded to the surface of the foam layer 222, formed of thermoplastic polyolefin (TPO), and having a thickness of 0.6 mm to 1 mm.

Further, in the present embodiment, the side fracture groove sections 36a and 36b, the hinge-side fracture groove sections 36c and 36d, and the center fracture groove section 36e are formed by forming small holes (blind holes), by means of a laser beam, on the reverse surface of the interior panel 22 in such a manner that the small holes do not pass completely through the substrate 221.

Next, operation of the airbag apparatus 20 of the second embodiment will be described.

Upon collision of the vehicle, an impact force caused by the collision is detected by an unillustrated sensor. A control unit including a CPU judges whether or not the detected impact force is equal to or greater than a predetermined value. When the control unit judges that the impact force is equal to or greater than the predetermined value, the control unit issues a signal for causing the inflater to generate a high-pressure gas. The gas is fed to the airbag 24 so as to promptly inflate the airbag 24. The inflating airbag 24 presses, from inside, the fracture-opening section 34 of the substrate 221 surrounded by the fracture groove 36. As a result, the center fracture groove section 36e, the side fracture groove sections 36a and 36b, and the hinge-side fracture groove sections 36c and 36d of the fracture-opening section 34 are fractured, whereby the fracture-opening section 34 surrounded by the fracture groove sections 36a to 36d is divided into two fracture-opening subsections 34a and 34b. The fracture-opening subsections 34a and 34b are separated from the substrate 221. Simultaneously, the rupture edges of the fracture opening subsections 34a and 34b cut the surface layer 223 along lines corresponding to the center fracture groove section 36e and the side fracture groove sections 36a and 36b. In this case, the surface layer 223 is not cut along lines corresponding to the hinge-side fracture groove sections 36c and 36d. With this, as shown in FIG. 8, the fracture-opening subsections 34a and 34b are opened in the manner of a casement as shown in FIG. 6, while being turned about hinge portions 303 of the reinforcement members 30, whereby the hinge portions 303 come into engagement with the hinge motion restricting portions 32a and 32b. As a result, the airbag 24 inflates and deploys to the outside of the interior panel 22 via the opening 48, which is formed through opening of the fracture-opening subsections 34a and 34b in the manner of a casement. Serving as a cushion, the inflated airbag 24 supports the passenger at his/her chest or head, thereby protecting the passenger from the impact force of collision.

The airbag apparatus according to the second embodiment achieves action and effects similar to those attained by the first embodiment.

In the above-described embodiments, the fracture groove 36 is formed by means of laser cutting. However, the present invention is not limited thereto, and can be applied to airbag apparatuses in which continuous or intermittent grooves or like depressions are formed on the reverse surface of the interior panel 22 by use of a cutting tool or the like.

The method of bonding the frame 28 and the reinforcement members 30 to the reverse surface of the interior panel 22 is not limited to vibration welding, and adhesive may be used to bond the frame 28 and the reinforcement members 30 to the reverse surface of the interior panel 22.

Obviously, numerous modifications and variations of the present invention are possible in light of the above teachings. It is therefore to be understood that within the scope of the appended claims, the present invention may be practiced otherwise than as specifically described herein.

What is claimed is:

1. An airbag apparatus for a vehicle comprising:
   an interior panel provided inside a passenger compartment of the vehicle;
   an airbag;
   an airbag case for accommodating the airbag in a folded condition;
   an inflater for supplying a gas to the airbag so as to inflate and deploy the airbag;
   a frame formed of a resin and supporting the airbag case behind the interior panel, the frame having a rectangular opening of an area required for inflation and deployment of the airbag, and an opening-side end portion of the frame being bonded to a reverse surface of the interior panel; and
   a pair of reinforcement members formed of a resin and reinforcing a fracture-opening section of the interior panel, the fracture-opening section facing the rectangular opening of the frame, wherein
   hinge motion restricting members are provided along a first pair of opposite sides of the rectangular opening of the frame in such a manner that the hinge motion restricting members project inward over a predetermined distance;
   a fracture groove is formed on the reverse surface of the fracture-opening section of the interior panel so as to enable the airbag to inflate and deploy toward the front side of the interior panel while rupturing the fracture-opening section, the fracture grove being composed of side fracture groove sections corresponding to a second pair of opposite sides of the rectangular opening, hinge-side fracture groove sections corresponding to ends of the hinge motion restricting members or locations offset from the ends of the hinge motion restricting members toward a central area of the opening, and a center fracture groove section connecting the side fracture groove sections; and
   each reinforcement member includes a support portion for coupling the reinforcement member with the frame, a reinforcement portion bonded to the reverse surface of the fracture-opening section surrounded by the hinge-side fracture groove sections, the side fracture groove sections, and the center fracture groove section, and a hinge portion facing the corresponding hinge motion restricting member and connecting the support portion and the reinforcement portion in a bendable manner.

2. An airbag apparatus for a vehicle according to claim 1, wherein the fracture-opening section of the interior panel is configured such that when the airbag inflates and deploys, the fracture-opening section is divided into two fracture-opening subsections surrounded by the hinge-side fracture groove sections, the side fracture groove sections, and the center fracture groove section; the fracture-opening subsections are separated from the interior panel and are opened in the manner of a casement, while being turned about the hinge portions of the reinforcement members; and the hinge portions are brought into engagement with the hinge motion restricting members.

3. An airbag apparatus for a vehicle according to claim 1, wherein each of the hinge-side fracture groove sections, the side fracture groove sections, and the center fracture groove section is formed by forming successive small holes on the reverse surface of the interior panel along a corresponding line through irradiation with a laser beam from the reverse side of the interior panel.

4. An airbag apparatus for a vehicle according to claim 1, wherein the frame is bonded to the reverse surface of the interior panel by means of vibration welding, and the reinforcement portions of the reinforcement members are bonded to the reverse surface of the fracture-opening section of the interior panel by means of vibration welding.

5. An airbag apparatus for a vehicle according to claim 1, wherein the fracture-opening section of the interior panel is configured such that when the airbag inflates and deploys, the fracture-opening section is divided into two fracture-opening subsections surrounded by the hinge-side fracture groove sections, the side fracture groove sections, and the center fracture groove section; the fracture-opening subsections are separated from the interior panel and are opened in the manner of a casement, while being turned about the hinge portions of the reinforcement members; and the center fracture groove section is offset from the boundary between the two fracture-opening subsections, so that the area of the other fracture-opening subsection becomes greater than that of the one fracture-opening subsection.

6. An airbag apparatus for a vehicle according to claim 1, wherein the hinge-side fracture groove sections are formed at locations corresponding to the ends of the hinge motion restricting members.

7. An airbag apparatus for a vehicle according to claim 1, wherein the interior panel includes a substrate formed of a synthetic resin, a foam layer layered over and bonded to an outer surface of the substrate and formed of a synthetic resin, and a surface layer layered over and bonded to an outer surface of the foam layer; and the fracture groove is formed on a reverse surface of the substrate.

* * * * *